United States Patent
Thomas et al.

(10) Patent No.: US 11,504,729 B2
(45) Date of Patent: *Nov. 22, 2022

(54) MEASURED DOSING AND SPRAY BOTTLE FOR MULTI-USE APPLICATIONS AND ASSOCIATED METHOD OF USING

(71) Applicant: Ecolab USA Inc., St. Paul, MN (US)

(72) Inventors: Candice J. Thomas, Winston Salem, NC (US); Robin B. Harbaugh, Colfax, NC (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/339,217

(22) Filed: Jun. 4, 2021

(65) Prior Publication Data
US 2021/0291210 A1 Sep. 23, 2021

Related U.S. Application Data

(63) Continuation of application No. 15/456,110, filed on Mar. 10, 2017, now Pat. No. 11,052,415.

(Continued)

(51) Int. Cl.
*B05B 11/00* (2006.01)
*G01F 11/26* (2006.01)
(Continued)

(52) U.S. Cl.
CPC ....... *B05B 11/0086* (2013.01); *A47J 37/0786* (2013.01); *B05B 11/3057* (2013.01);
(Continued)

(58) Field of Classification Search
CPC ............. B05B 11/0059; B05B 11/0086; B05B 11/0037; B05B 11/30–3057;
(Continued)

(56) References Cited

U.S. PATENT DOCUMENTS 1,208,634 A 12/1916 Paulson et al.
3,814,292 A 6/1974 Dargols
(Continued)

FOREIGN PATENT DOCUMENTS

CN 1438956 A 8/2003
CN 1958403 A 5/2007
(Continued)

OTHER PUBLICATIONS

DE20201532_MT; machine translation into english of DE20201532, obtained on Apr. 9, 2022 from https://worldwide.espacenet.com/.*

(Continued)

*Primary Examiner* — Paul R Durand
*Assistant Examiner* — Randall A Gruby
(74) *Attorney, Agent, or Firm* — Fredrikson & Byron, P.A.

(57) ABSTRACT

Embodiments include a bottle and method for cleaning a grill. An exemplary method may be applied to grills having an upper grill and a lower grill. Methods can include providing a bottle having a dosing chamber with a first outlet, a reservoir chamber configured to store a solution and including a second outlet, and a sprayer for dispensing solution via the second outlet. The sprayer includes a spray head and a trigger that, when actuated, draws solution from the reservoir chamber and dispenses it by spraying the solution from the spray head. Methods can include filing the dosing chamber with a predetermined dose of solution from the reservoir chamber and dispensing the solution onto the lower grill from the first outlet, and dispensing the solution onto the upper grill by spraying the solution onto the upper grill from the second outlet.

20 Claims, 21 Drawing Sheets

Related U.S. Application Data

(60) Provisional application No. 62/306,467, filed on Mar. 10, 2016.

(51) Int. Cl.
*B65D 47/12* (2006.01)
*B65D 25/56* (2006.01)
*A47J 37/07* (2006.01)

(52) U.S. Cl.
CPC ........... *B65D 25/56* (2013.01); *B65D 47/122* (2013.01); *G01F 11/262* (2013.01); *B05B 11/0037* (2013.01); *B05B 11/0056* (2013.01)

(58) Field of Classification Search
CPC .. B65D 47/00–122; B65D 25/56; B08B 3/10; G01F 11/262
See application file for complete search history.

(56) References Cited

U.S. PATENT DOCUMENTS

| | | | |
|---|---|---|---|
| 3,948,105 A | | 4/1976 | Johnson |
| 4,298,038 A | | 11/1981 | Jennings |
| 4,618,076 A | * | 10/1986 | Silvenis ............. B05B 11/0086 222/541.9 |
| 4,646,948 A | * | 3/1987 | Jennings ............... G01F 11/262 141/2 |
| 4,700,892 A | | 10/1987 | Cunning |
| 4,705,191 A | | 11/1987 | Hanshelmut et al. |
| 4,832,230 A | | 5/1989 | Janowitz |
| 4,860,927 A | | 8/1989 | Grinde |
| 4,893,732 A | | 1/1990 | Jennings |
| 4,925,066 A | | 5/1990 | Rosenbaum |
| 4,932,563 A | | 6/1990 | Diamond et al. |
| 5,135,138 A | | 8/1992 | Call |
| 5,165,576 A | | 11/1992 | Hickerson |
| 5,447,245 A | | 9/1995 | Merhar |
| D363,020 S | | 10/1995 | Mason, Jr. et al. |
| 5,480,071 A | | 1/1996 | Santagiuliana |
| D367,815 S | | 3/1996 | Mason, Jr. et al. |
| 5,518,150 A | | 5/1996 | Witt, Jr. |
| 5,518,152 A | | 5/1996 | Burcham et al. |
| 5,542,581 A | | 8/1996 | Habora et al. |
| 5,556,011 A | | 9/1996 | Jennings et al. |
| 5,570,840 A | | 11/1996 | Gettinger et al. |
| 5,695,093 A | | 12/1997 | Lucius |
| 5,788,125 A | | 8/1998 | Steiner et al. |
| 6,022,134 A | | 2/2000 | Andrews |
| 6,123,230 A | | 9/2000 | Klima, Jr. et al. |
| 6,213,358 B1 | | 4/2001 | Libit et al. |
| 6,290,102 B1 | | 9/2001 | Jennings et al. |
| 6,319,453 B1 | | 11/2001 | Klima et al. |
| 6,345,774 B1 | | 2/2002 | Calhoun |
| 6,398,132 B1 | | 6/2002 | Junkel et al. |
| 6,568,562 B1 | | 5/2003 | Klima et al. |
| 6,575,336 B1 | | 6/2003 | Bayer |
| 6,871,760 B1 | | 3/2005 | Snider |
| D503,623 S | | 4/2005 | Engelen et al. |
| 7,118,012 B2 | | 10/2006 | Butler |
| D564,364 S | | 3/2008 | White et al. |
| 7,520,447 B2 | | 4/2009 | Engelen et al. |
| D597,408 S | | 8/2009 | Chang |
| D602,379 S | | 10/2009 | Traiforos |
| D622,159 S | | 8/2010 | Jennings et al. |
| 7,850,043 B2 | | 12/2010 | Foster |
| 7,926,682 B2 | | 4/2011 | Nelson et al. |
| 7,938,258 B2 | | 5/2011 | Saravanane et al. |
| 8,319,654 B2 | | 11/2012 | Field et al. |
| 8,322,576 B2 | | 12/2012 | Gioia |
| D677,571 S | | 3/2013 | Jennings et al. |
| D706,645 S | | 6/2014 | Jennings et al. |
| 9,051,073 B2 | | 6/2015 | Jennings et al. |
| 9,132,440 B2 | | 9/2015 | Chernik et al. |
| D747,976 S | | 1/2016 | Martin |
| D802,439 S | | 11/2017 | Bapat et al. |
| 2002/0020720 A1 | | 2/2002 | Schmid et al. |
| 2004/0050874 A1 | | 3/2004 | Blanchester |
| 2004/0112922 A1 | | 6/2004 | Ouellette |
| 2004/0238566 A1 | | 12/2004 | Stank et al. |
| 2005/0109782 A1 | * | 5/2005 | Biesecker .............. B65D 41/04 220/837 |
| 2006/0151548 A1 | | 7/2006 | Seris et al. |
| 2007/0056995 A1 | | 3/2007 | Cotter |
| 2010/0096414 A1 | | 4/2010 | Dennis |
| 2010/0096415 A1 | | 4/2010 | Dennis |
| 2011/0089068 A1 | | 4/2011 | Shin |
| 2011/0127297 A1 | | 6/2011 | Jennings et al. |
| 2011/0180100 A1 | | 7/2011 | Hafer et al. |
| 2012/0018458 A1 | | 1/2012 | Chernik et al. |
| 2013/0193232 A1 | | 8/2013 | Dobias et al. |
| 2014/0252039 A1 | | 9/2014 | Jennings et al. |
| 2014/0371690 A1 | | 12/2014 | Sprada et al. |
| 2015/0352571 A1 | | 12/2015 | Petkus et al. |
| 2017/0088334 A1 | | 3/2017 | Bapat et al. |

FOREIGN PATENT DOCUMENTS

| | | | |
|---|---|---|---|
| CN | 201647402 U | | 11/2010 |
| DE | 20201532 | * | 4/2002 |
| DE | 20201532 U1 | | 5/2002 |
| EP | 10965 B1 | | 5/1982 |
| EP | 347957 A2 | | 12/1989 |
| EP | 170980 B1 | | 6/1990 |
| EP | 674948 A1 | | 10/1995 |
| EP | 1275441 A1 | | 1/2003 |
| EP | 1726532 A2 | | 11/2006 |
| EP | 1923676 B1 | | 8/2010 |
| EP | 2207625 B1 | | 5/2012 |
| EP | 2243721 B1 | | 1/2013 |
| GB | 2369609 B | | 2/2006 |
| GB | 2478141 A | | 8/2011 |
| JP | S57117373 U | | 7/1982 |
| WO | 9959911 A1 | | 11/1999 |
| WO | 2009148243 A2 | | 12/2009 |

OTHER PUBLICATIONS

European Patent Application No. 17764213.9, Extended European Search Report dated Oct. 7, 2019, 8 pages.

International Patent Application No. PCT/US2017/021877, International Search Report and Written Opinion dated Jun. 22, 2017, 16 pages.

"Original Simple moments Portable summer for creative outdoor sports bottle large plastic spray water bottle," UPSTYLE, retrieved online from <https://www.aliexpress.com/item/Portable-summer-for-creative-outdoor-sports-bottle-large-plastic-cup-spray-water-bottle/32400023162.html?spm=2114.01010208.3.11.XIN6eL&ws_ab_test=searchweb201556_1,searchweb201644_3_505_506_503_504_502_9884_10001_10002_> on Aug. 24, 2017, known to be available prior to Feb. 18, 2016, 9 pages.

"VWR Adjustable Spray Wash Bottle," VWR International, retrieved online from <https://us.vwr.com/store/catalog/product.jsp?product_id=4583969> on Aug. 24, 2017, known to be available prior to Feb. 18, 2016, 1 page.

* cited by examiner

MEASURED DOSING AND SPRAY BOTTLE FOR MULTI-USE APPLICATIONS AND ASSOCIATED METHOD OF USING

CROSS-REFERENCE TO RELATED APPLICATION

The present application is a continuation of U.S. Nonprovisional application Ser. No. 15/456,110, filed Mar. 10, 2017, which claims the benefit of U.S. Provisional Application Ser. No. 62/306,467, filed Mar. 10, 2016, which applications are incorporated herein by reference in their entirety.

BACKGROUND

Cleaning appliances such as cooking appliances is made easier by the use of cleaners which help remove stubborn substances including grease. Removing these substances to prevent build-up or deposits is important because it prolongs the life of the appliance and supports proper operation of the appliance.

Cleaners such as cleaning solutions may be dispensed from bottles. Other solutions beside cleaners may also be dispensed.

SUMMARY

In general, this disclosure is directed to a bottle for dispensing solutions (e.g., fluids, liquids) and methods for dispensing solutions and cleaning. The exemplary bottles and methods described herein are directed to bottles and methods of cleaning, including, but not limited to, cleaning of items such as appliances.

Appliances that require regular cleaning include grills, particularly grills that are used in restaurants. Such grills may have an upper grill and a lower grill arranged so the food is cooked in between the surfaces of the upper and lower grills. Generally, the upper grill (e.g., platen) is pivotable with respect to the lower grill. In order to clean these grills, cleaners are applied to the various surfaces of the grill.

Due to opposing upper grill surfaces and lower grill surfaces of such grills, dispensing cleaners onto the grill can be awkward. Further, it can be difficult to dispense cleaner in a measured fashion. Dispensing the proper amount of cleaner is important because enough cleaner is needed to ensure proper cleaning. However, dispensing too much cleaner onto the grill can be wasteful and takes longer to rinse off. Depending on the characteristics of the cleaner, dispensing excess cleaner may also be harmful for the appliance or the user.

In an exemplary embodiment of a bottle, the bottle includes: a dosing chamber with a first outlet and a reservoir chamber with a second outlet. The reservoir chamber is configured to store the solution. A spray head is coupled to the second outlet for dispensing solution via the second outlet. The sprayer may include a spray head and a trigger that when actuated draws solution from the reservoir chamber and dispenses it by spraying. The sprayer may be arranged at a second outlet.

In an exemplary embodiment, the disclosure provides a method of cleaning a grill with a solution. In some embodiments the solution may be a cleaning solution. The method may be applied to a grill, the grill having an upper grill and a lower grill. The method includes providing the exemplary bottle.

Steps of the method may include filing the dosing chamber with a predetermined dose of solution from the reservoir chamber and dispensing the solution onto the lower grill by pouring the solution onto the lower grill from the first outlet. Steps of the method may further include dispensing the solution onto the upper grill by spraying the solution onto the upper grill.

The present disclosure resolves problems with cleaning and dispensing solutions onto an item being cleaned. In particular, cleaning is made easier by efficiently dispensing solution directly onto two surfaces from the same bottle where the surfaces arranged in different orientations. The solution dispensable from the bottle in a measured (e.g., dosed, predetermined, pre-measured, graduated) fashion in two different ways from two different outlets.

The details of one or more examples are set forth in the accompanying drawings and the description below. Other features, objects, and advantages will be apparent from the description and drawings, and from the claims.

DETAILED DESCRIPTION

The following detailed description is exemplary in nature and is not intended to limit the scope, applicability or configuration of the disclosure in any way. Rather, the following description provides practical illustrations for implementing illustrative embodiments of the disclosure.

The disclosure provides an advantageous measured dosing and spray bottle. An exemplary measured dosing and spray bottle of the present disclosure may be provided as shown with respect to FIG. 1. Generally, the measured dosing and spray bottle includes: a dosing chamber, a first outlet for pouring measured solution from the measure dosing portion, and a sprayer including spray head for spraying solution. The benefit of this arrangement is that because the bottle is configured to dispense solution in two different ways, a method of applying solution to surfaces that are arranged in different orientations can be accomplished with a single bottle of solution.

The disclosure also provides an advantageous method of cleaning a grill, especially grills having an upper grill and a lower grill. An exemplary method of cleaning a grill of the present disclosure may be provided as shown with respect to FIGS. 3-20. The method of FIGS. 3-20 may be accomplished using a measured dosing and spray bottle such as the exemplary bottle provided in FIG. 1.

Figure 2:
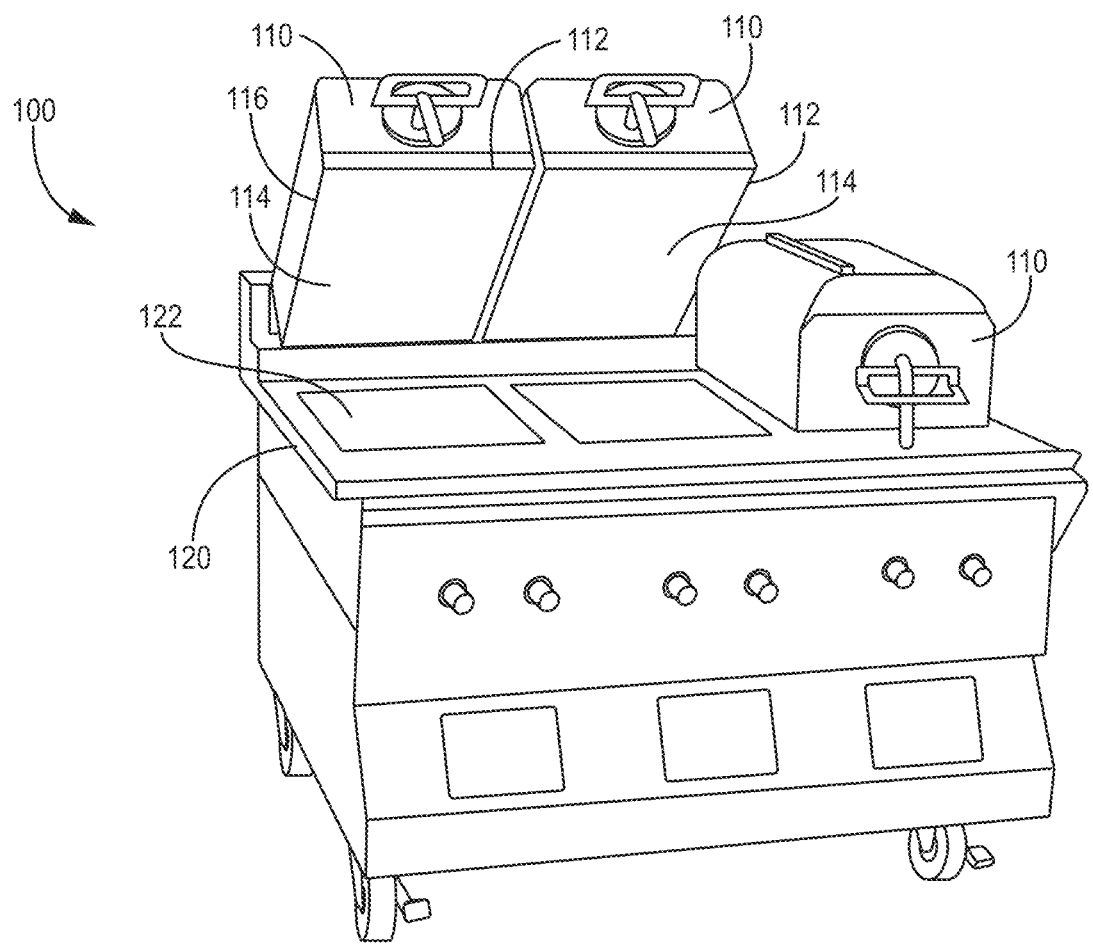
FIG. 2 is a perspective views of an exemplary grill that could be cleaned using the exemplary bottle of FIG. 1 according to one or more steps of an exemplary method of cleaning a grill, the method as described in FIG. 3-20.

The exemplary bottle and method provide improved ergonomics for the user when applying solution to surfaces arranged in different orientations, such as the exemplary grill of FIG. 2 including both an upper grill and a lower grill.

Figure 1:
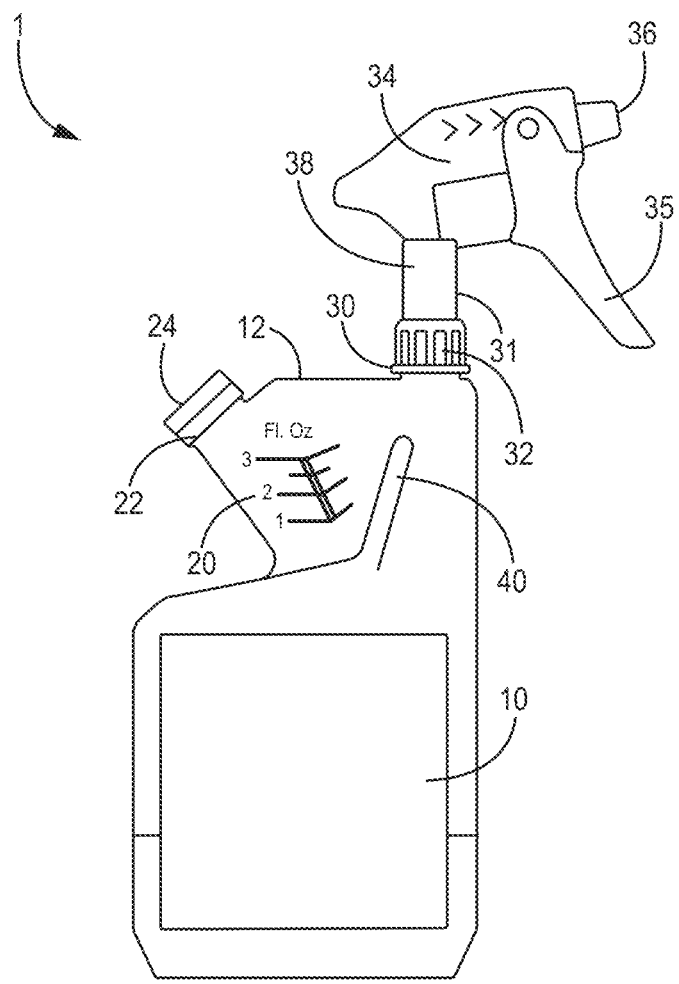
FIG. 1 is a side view of an exemplary measured dosing and spray bottle that could be used in a method of cleaning a grill.

An exemplary embodiment of a measured dosing and spray bottle 1 is shown in FIG. 1. The exemplary bottle 1 may include: a reservoir chamber 10, a dosing chamber 20 in fluid communication with the reservoir chamber, and a partition 40 forming a barrier between the reservoir chamber 10 and the dosing chamber 20. In some examples, the partition 40 defines a boundary of the dosing chamber 20.

The bottle 1 further includes a first outlet 22 configured for pouring and a second outlet 30 having a sprayer 31. More particularly, the first outlet 22 may be configured for pouring a measured dose of solution from the dosing chamber 20, while the second outlet 30 may be configured for spraying solution from the reservoir chamber 10 via a spray head 34. Though referred to as outlets, in some examples, first outlet 22 and/or second outlet 30 can be used to fill the dosing chamber 20 and/or the reservoir chamber 10 with a solution.

In the example of FIG. 1, the spray head includes a nozzle 36 and a trigger 35. During operation, a user may squeeze the trigger 35 to cause solution to be sprayed out of the bottle 1 via nozzle 36. As shown, in some examples, one end of the trigger 35 can be attached to the spray head 34 via a pin or other attachment point so that the rest of the trigger 35 rotates about its attachment point when actuated.

The reservoir chamber 10 may be sized to hold enough solution to fill the dosing chamber 20 multiple times. The dosing chamber 20 may be arranged proximate an upper end 12 of the bottle 1, the upper end 12 being defined as the end opposite the end of the bottle 1 that is designed to be supported by the floor, ground or table when the bottle 1 is in the bottle's resting orientation (e.g., the orientation shown in FIG. 1). As shown with reference to FIG. 9, the dosing chamber 20 is filled by tipping or rotating the bottle 1 more than 90 degrees from the bottle's resting orientation so that fluid in the reservoir chamber 10 flows over partition 40 into the dosing chamber 20. Once the dosing chamber 20 is filled to a desirable level, the bottle 1 is returned to the resting orientation, as shown in FIG. 9, which will be described herein in further detail.

Solution may be dispensed from the bottle 1 in at least two ways. For example, solution may be dispensed both via the first outlet 22 and via the separate sprayer 31 coupled to a second outlet 30.

The first outlet 22 (e.g., for pouring) is arranged proximate and in fluid communication with the dosing chamber 20 to facilitate dosing of a measured or predetermined amount of solution. In some embodiments the dosing chamber 20 may include a single measurement marking or graduated measurement markings. In some examples, the measurement markings indicate an amount of volume of solution in the dosing chamber 20 when the bottle 1 is in a vertical orientation. Additionally or alternatively, measurement markings can be positioned and oriented so that a user may measure an amount of solution in the dosing chamber 20 when the bottle 1 is in a non-vertical orientation. For example, measurement markings may indicate to a user an amount of solution in the dosing chamber 20 while solution is being transferred from the reservoir chamber 10 into the dosing chamber 20 so that a user may control the amount of solution in the dosing chamber 20 with greater resolution.

Figure 9:
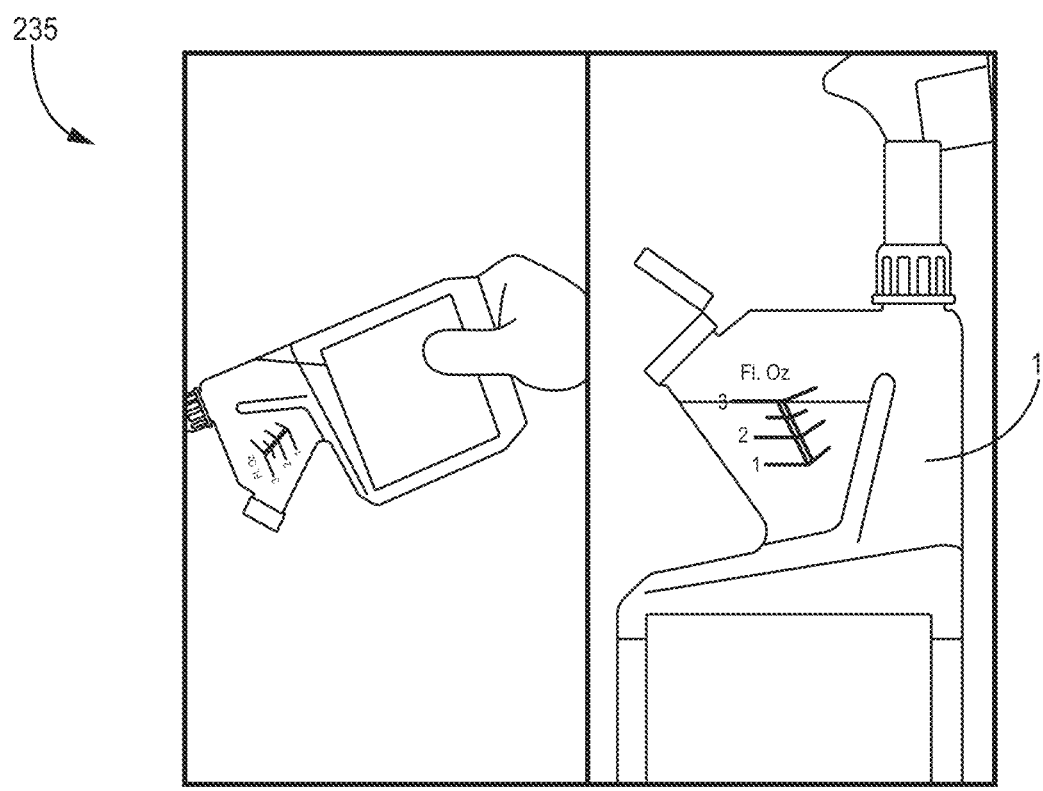

In some examples, bottle 1 includes a cap 24 configured to selectively close the first outlet 22 to prevent the solution from undesirably spilling out of the dosing chamber 20, for example, when tipping or rotating the bottle as shown in FIG. 9. In some examples, cap 24 can include a screw cap including a threaded inner surface and configured to engage a threaded surface at the first outlet 22. Additionally or alternatively, cap 24 can include a flip cap, including a first portion for engaging the bottle 1 at the first outlet 22 and a second portion that can engage or disengage the first portion in order to permit solution to exit the dosing chamber 20 via the first outlet 22. In some examples, the flip cap can be oriented so that the second portion disengages the first portion and rotates toward the spray head 34 so that the second portion does not impede flow of the solution out of the first outlet 22 and onto a surface.

The sprayer 31 (e.g., for spraying) may be coupled to the bottle at the second outlet. The benefit of being able to dispense the same solution from the same bottle by both pouring and spraying is that awkwardness and extra steps to apply the solution to different surfaces is reduced. For example, with conventional cleaning tools and methods, when you are fighting gravity to dispense the solution on to the surface, you may have to pour the solution onto a cloth and then apply it to the surface, creating extra steps, a lack of measurement of the solution, and in some cases the need for multiple bottles or cleaning tools.

In some embodiments the sprayer 31 may be configured to dispense solution from the reservoir chamber 10. In other embodiments, it is contemplated that the sprayer 31 could be configured to dispense solution from the dosing chamber 20. Having the sprayer 31 configured to dispense solution from the dosing chamber 20 would provide the ability to control the amount of solution being dispensed by the sprayer 31 so that only the measured or predetermined amount of solution contained in the dosing chamber 20 is provided to the sprayer 31.

In the illustrated example of FIG. 1, the sprayer 31 includes an attachment portion 32 configured to secure the sprayer 31 to the second outlet 30 of the bottle 1. In some embodiments, the attachment portion 32 comprises a screw cap including a threaded surface configured to engage a corresponding threaded surface at the second outlet 30.

The sprayer 31 of FIG. 1 further includes an elongate neck 38 extending between the attachment portion 32 and the spray head 34. In some examples, the neck 38 of the sprayer 31 is sufficiently long so that, when actuated, the trigger 35 does not extend below the upper end 12 of the bottle 1. This configuration provides several ergonomic benefits to a user. For example, regardless of the orientation of the sprayer 31, the bottle 1 (e.g., the dosing chamber 20) does not impede the actuating of the trigger 35 for spraying solution from nozzle 36 of sprayer 31. Additionally, this configuration provides a convenient grasping surface for a user, wherein a user can grasp the neck 38 of the sprayer 31 with the hand while reaching the trigger 35 with the fingers of the same hand without the grasping being impeded by the, for instance, the dosing chamber 20.

FIG. 2 is an example of a grill 100 that may be used in combination with the measured dosing and spray bottle 1 with reference to FIG. 1. The exemplary grill 100 may also be used with a method 200 of cleaning a grill 100 as described with respect to FIGS. 3-20.

The exemplary grill 100 includes a lower grill 120 having a lower grill surface 122, and an upper grill 110 having an upper grill surface 114. The upper grill 110 may be arranged such that the upper grill surface 114 (e.g., one or more platens) faces the lower grill surface 122 during cooking. The upper grill 110 may be pivotable with respect to the lower grill 120 such that a space between the upper and lower grills 110, 120 is accessible.

The upper grill 110 may be divided into multiple sections, such as one or more platens. Each platen 112 may be pivotable separate from one another. In addition to the upper grill surface 114 of each platen 112, each platen 112 may also have sides that extend around the perimeter of the platen 112.

In some embodiments of the grill 100, upper and/or lower release sheets 140 may be provided. If used, the upper release sheets 150 are installed over the upper grill surface(s) 114 (e.g., platens) and/or lower release sheets 140 are installed over the lower grill surface(s) 122. Release sheets 140, 150 may be made of TEFLON® or any other suitable material including other non-stick type materials.

Upper and lower release sheets 150, 140 are provided to produce better beef patty quality, creating a juicier patty with less internal temperature gap. The release sheets 142 also provide easier operation for the user in the form of smooth patty removal. The release sheets 142 result in easier maintenance as the release sheets 142 are stain-resistant, making the daily cleaning process easier. Release sheets 140, 150 also improve not only quality, but also food safety ensuring that patties are cooked to the correct temperature.

To maintain proper function of the grill 100 and prevent damage, it is important to properly and regularly clean the grill 100 including the upper and lower grills 110, 120, especially the platens 112 and the lower grill surface 122. In embodiments where upper and or lower release sheets 150, 140 are used, it is also important to properly clean the release sheets 150, 140 and properly re-install them after cleaning.

Steps of the exemplary method 200 of cleaning a grill, such as the grill 100 of FIG. 2, will now be described with respect to the steps of FIGS. 3-20 and the flow chart of FIG. 21. The grill referenced in the steps is the exemplary grill described above, however the method is not limited to the exemplary grill.

Figure 3:
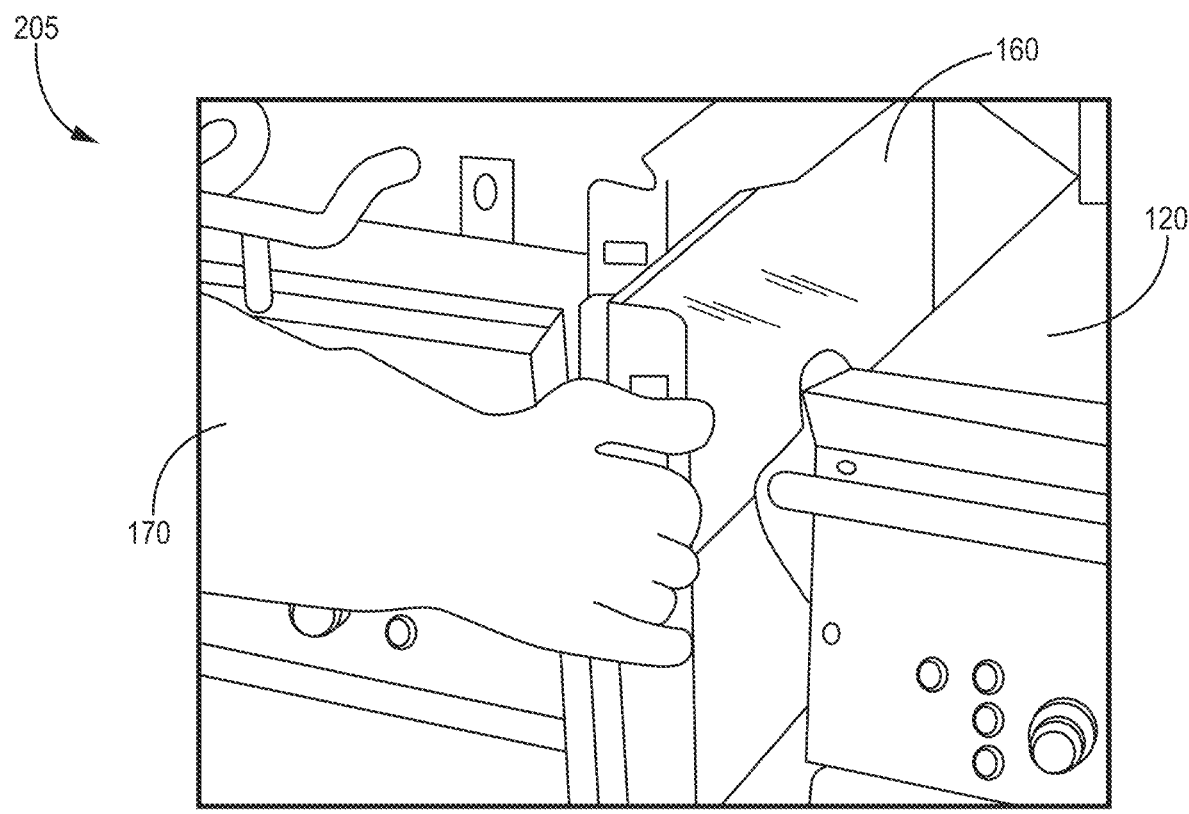
FIGS. 3-20 are illustrations showing possible steps of an exemplary method of cleaning a grill.

FIG. 3 is an illustration of step 205 of the method 200 of cleaning a grill. Step 205 may include preparation for cleaning the grill 100 such as placing the grill 100 in the clean mode (if the grill 100 has this setting). Step 205 may also include putting on heat-resistant gloves 170, removing and emptying a grease trough 160, rinsing and replacing the grease trough 160, and gathering other materials for completing the cleaning steps while the grill 100 is cooling down. Other materials may include e.g., gloves, grill cloths 172, cleaner, etc.

Figure 4:
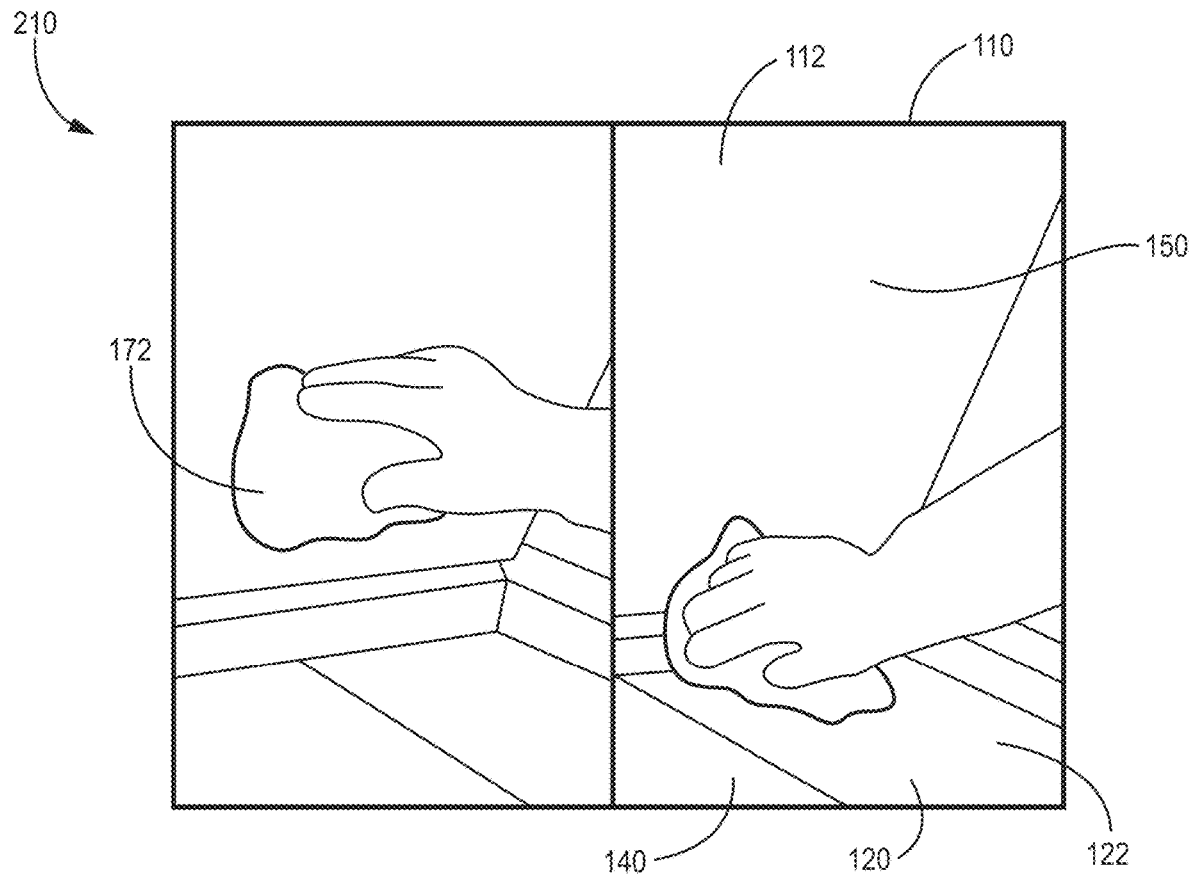

FIG. 4 is an illustration of step 210 of the method 200. Step 210 may include wiping the upper release sheet(s) 150 with a clean sanitizer-soaked grill cloth 172. In embodiments where an upper release sheet 150 is not present, the upper grill surface 114(s) may be wiped. Step 210 may also include wiping the lower release sheet(s) 150 with a clean sanitizer-soaked grill cloth 172 and discarding the grill cloth 172. In some embodiments where a lower release sheet 140 is not present, the lower grill surface 122(s) may be wiped instead of the lower release sheet 140.

Figure 5:
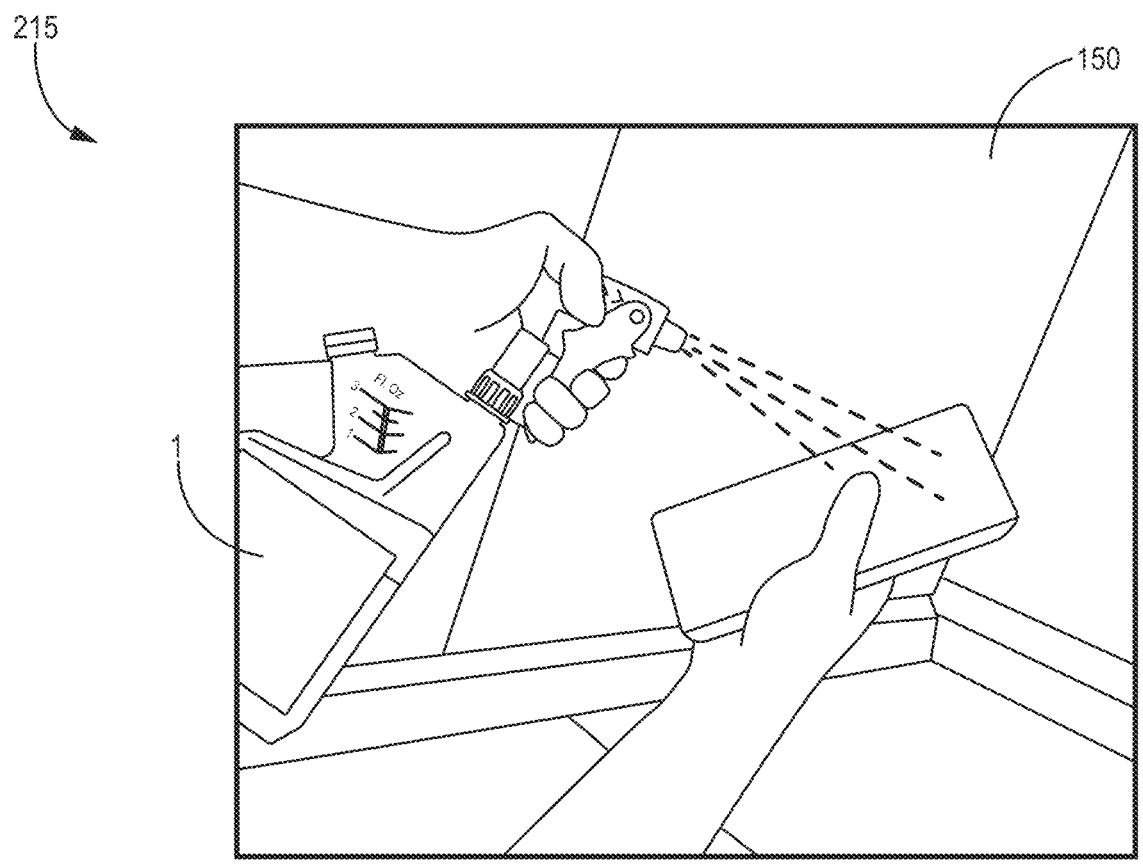

FIG. 5 is an illustration of step 215 of the method. Step 215 may include spraying a clean sanitizer-soaked grill cloth 172 with a solution of cleaner or sanitizer such as Heat-Activated Grill and Toaster Cleaner (HAGTC) and cleaning the exposed surfaces of the upper and lower release sheets 150, 140 (as applicable) and discarding the grill cloth 172.

Figure 6:
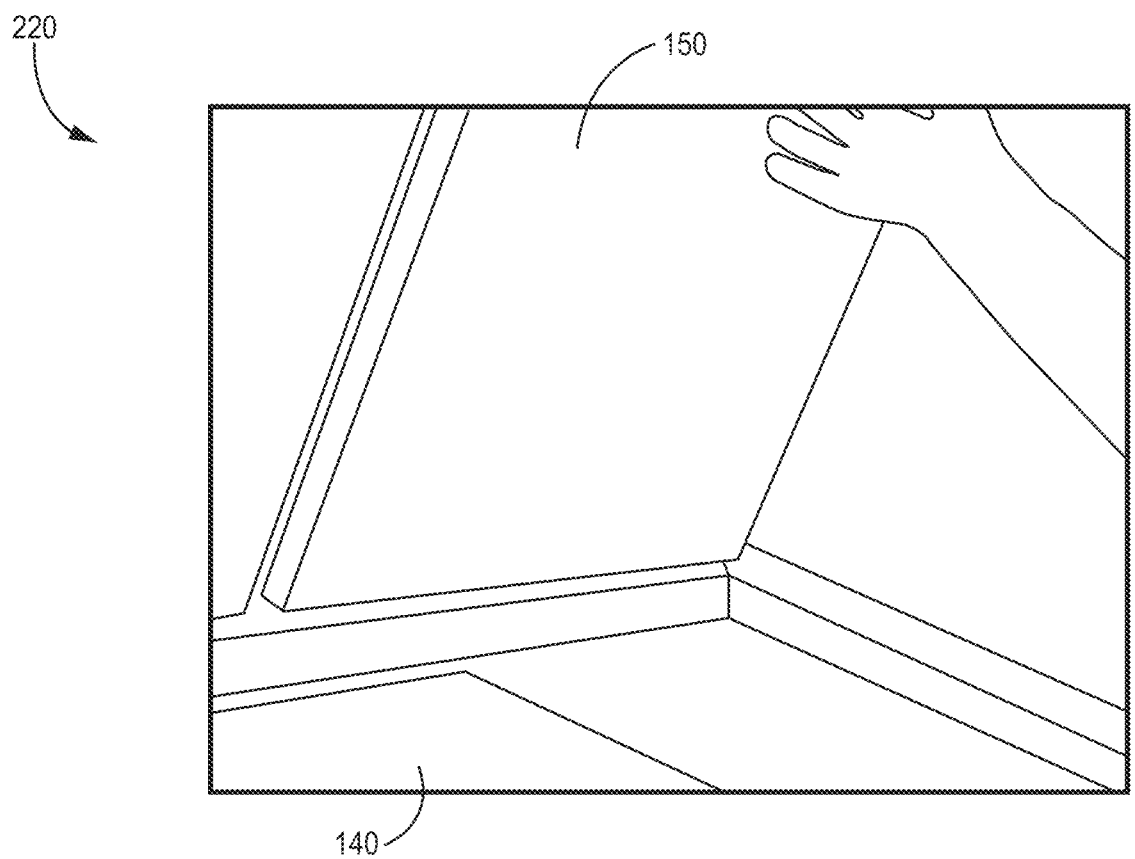

FIG. 6 is an illustration of step 220 of the method 200 of cleaning the grill 100. Step 220 may include removing the release sheets 140, 150 and any clips and bars.

Figure 7:
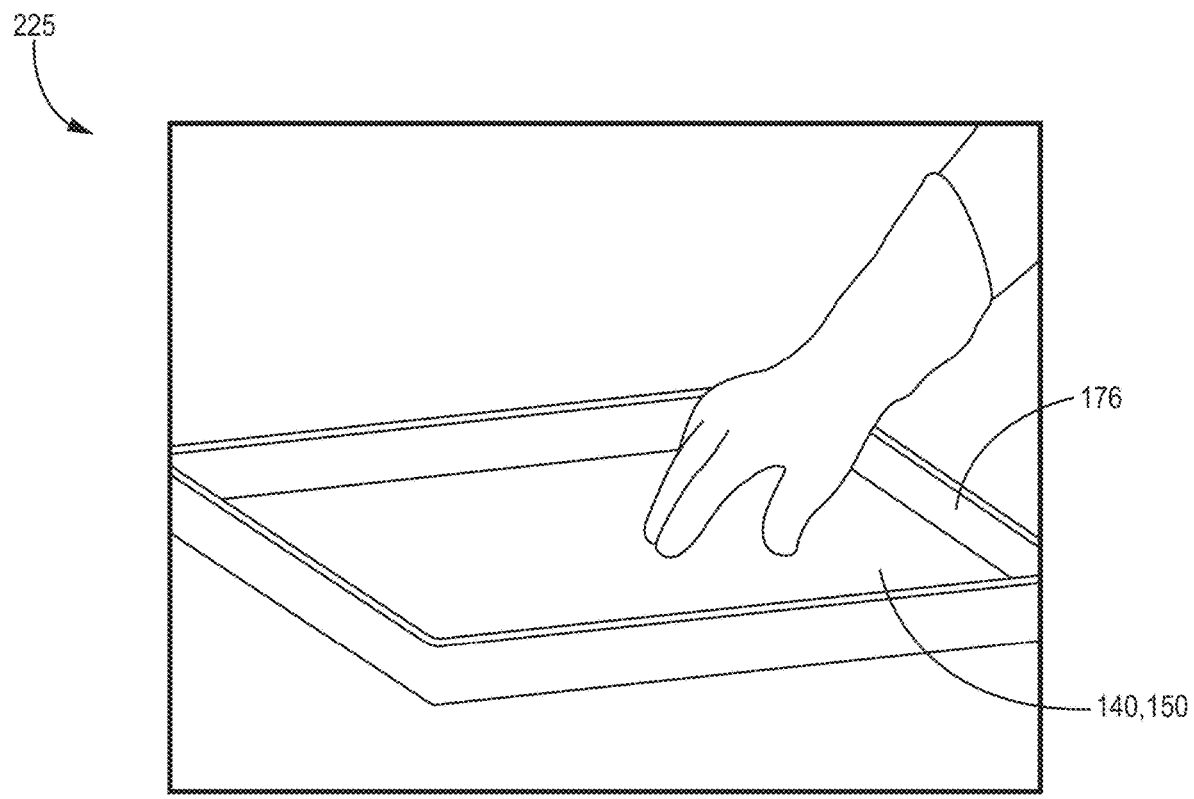

FIG. 7 is an illustration of step 225 of the method. Step 225 may include placing all the release sheets 140, 150 flat on a release sheet storage tray 176 and washing the clips and bars (if present). The clips and bars may be washed, rinsed and sanitized in a sink or other suitable means such as a dish washer.

Figure 8:
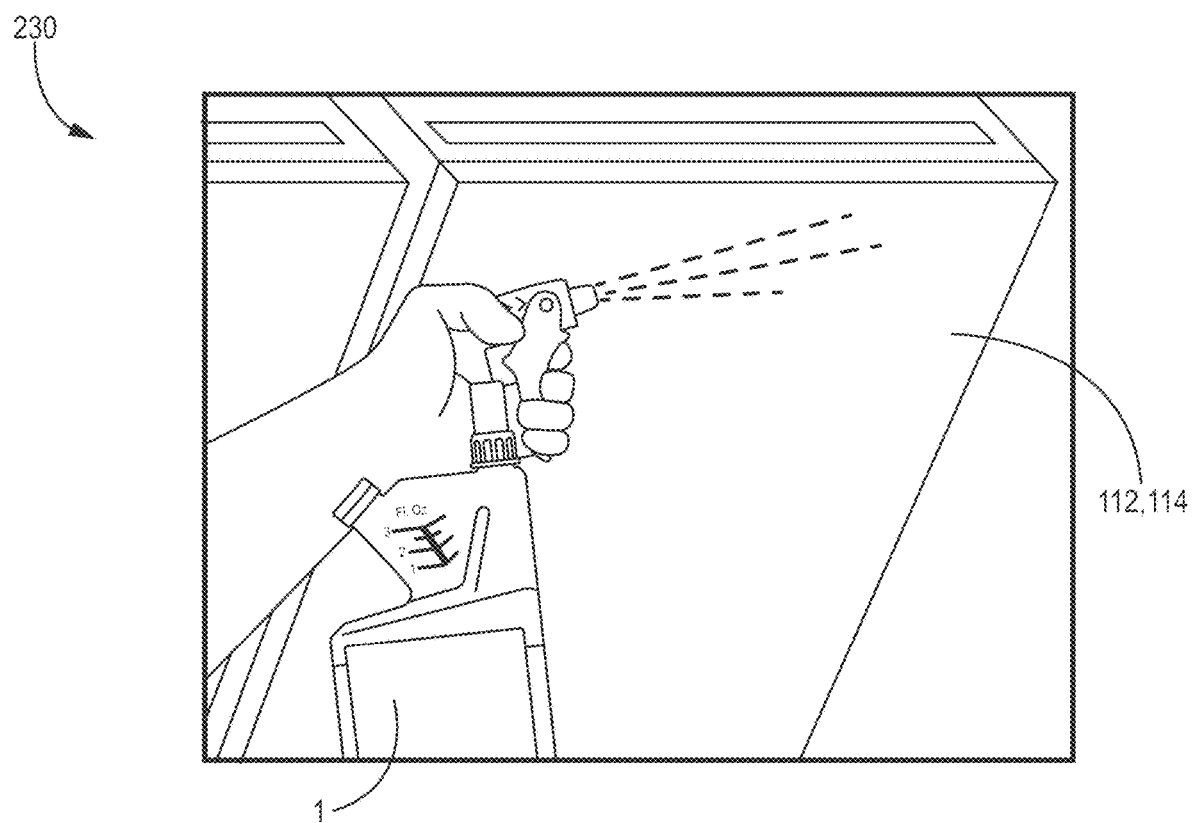

FIG. 8 is an illustration of step 230 of the method. Step 230*a* may include providing and using a bottle 1 such the exemplary dosing and spray head 34 bottle 1 of FIG. 1 to apply solution (e.g., fluid cleaner) to the upper grill 110 surfaces (e.g., platens). The solution may be applied using the spray head 34. If the spray head 34 is not already attached to the bottle 1, step 230 may include attaching the spray head 34 to the bottle 1. For example, by threading the spray head 34 onto the bottle 1 at the second outlet 30.

The solution in the bottle 1 may again be HAGTC, but any suitable solution may be used. In some embodiments spraying the upper grill surfaces 114 (step 230*b*) with cleaner includes spraying each platen 7 times. For example, for each platen 112, spray once for each side and spray three times for the upper grill surface 114 of the platen 112 that faces the lower grill surface 122. In some cases lowering one platen 112 at a time aids the user in properly spraying the sides 116 of the platens 112.

FIG. 9 is an illustration of step 235 of the method. Step 235 may include measuring out a dose of solution (e.g., using the same exemplary bottle 1). To measure out a dose of solution, the bottle 1 may be inverted as shown in FIG. 9 to fill the dosing chamber 20 with solution from the reservoir chamber by allowing the solution to flow over the partition 40. For example, the dosing chamber 20 is filled by tipping or rotating the bottle 1 more than 90 degrees from the bottle's resting orientation until the dosing chamber 20 is filled and then returning the bottle 1 to the resting orientation. The dosing chamber 20 may be opened by opening cap 24 on the dosing chamber 20 (e.g., by flipping a portion of flip cap). FIG. 9 depicts a flip cap 24 that is tethered to a bottle coupling portion of the cap 24 by a living hinge, but any suitable closure mechanism may be used in place of the flip cap 24.

Figure 10:
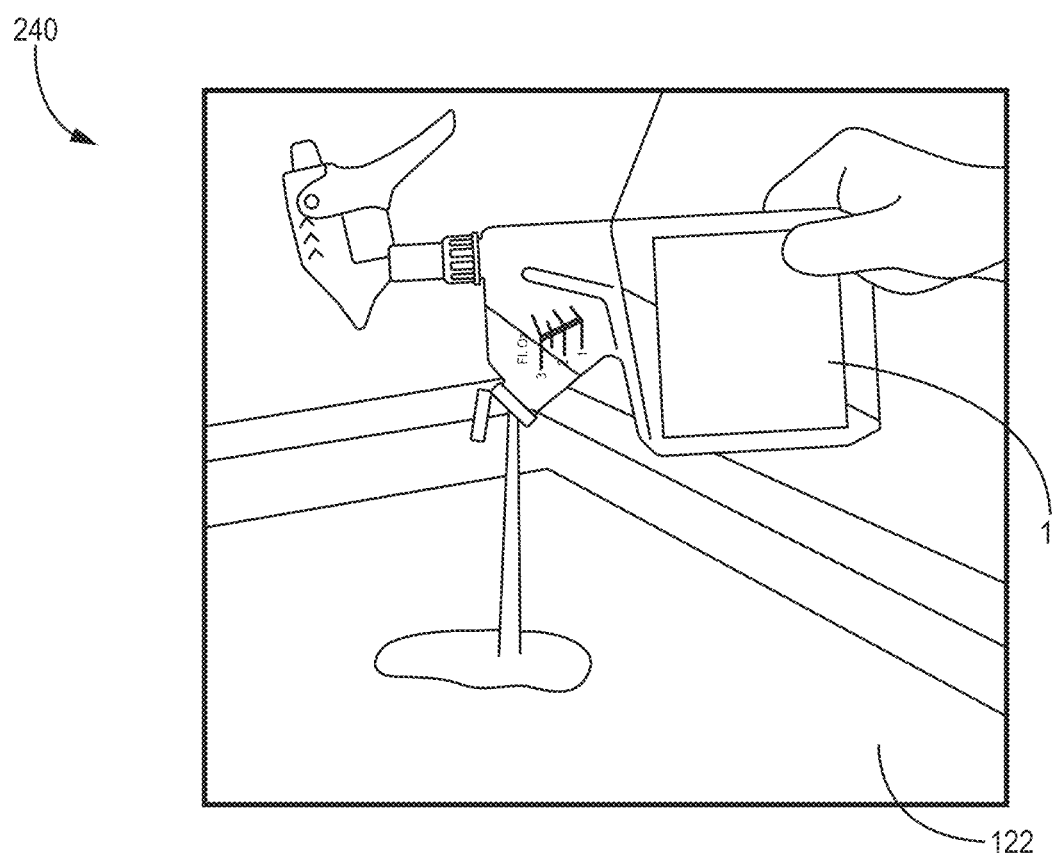

FIG. 10 is an illustration of step 240 of the method. Step 240 may include pouring the dosed cleaner onto the lower grill surface 122. In some embodiments, pouring the dosed cleaner may be most accurate and safe if the bottle 1 is poured at a 90 degree angle as shown in FIG. 10. When pouring is complete, the flip cap 24 on the dosing chamber 20 may be closed. In some embodiments, the dosing chamber 20 may be configured to measure out about 2 ounces of solution.

Figure 11:
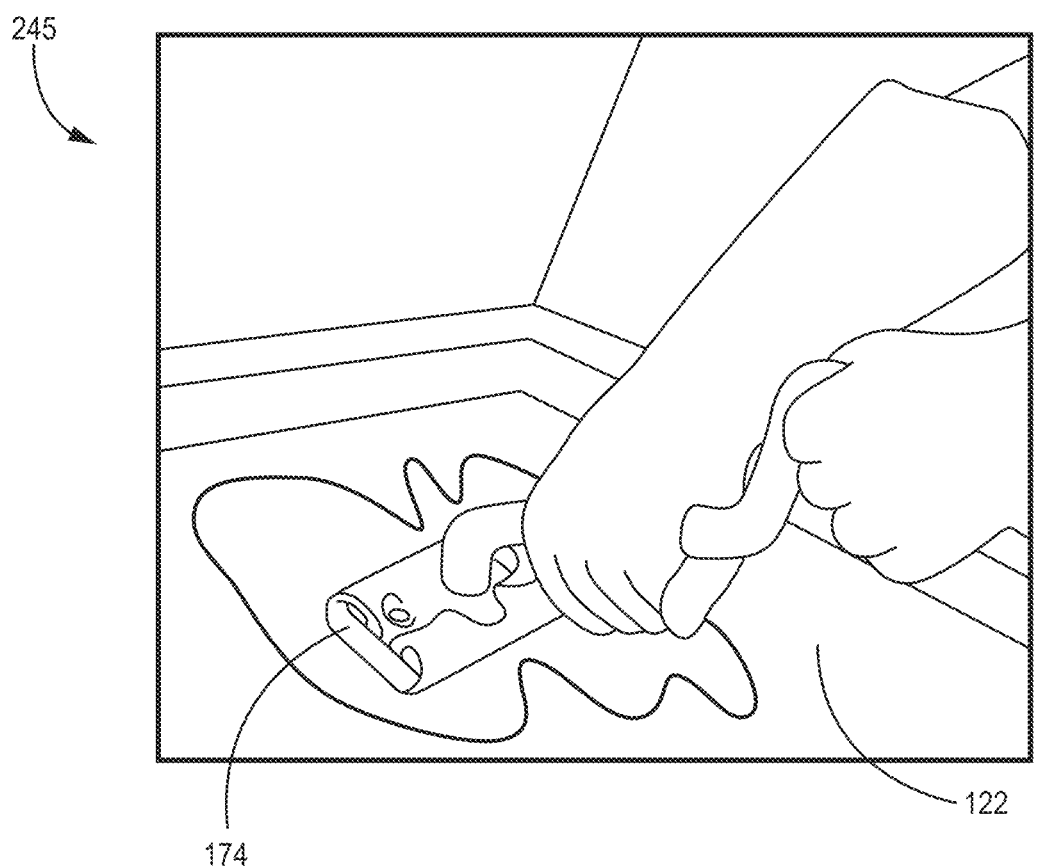

FIG. 11 is an illustration of step 245 of the method. Step 245 may include allowing the cleaner to sit on the grill 100 surfaces (e.g., upper platens, lower grill surface 122). By allowing the cleaner to sit on the grill surfaces 114, 122, less effort and time is required to scrub heavy soil build-up and achieve a clean grill 100. Step 245 may also include scrubbing the grill 100 surfaces using a grill cleaning pad holder and pad 174.

Figure 12:
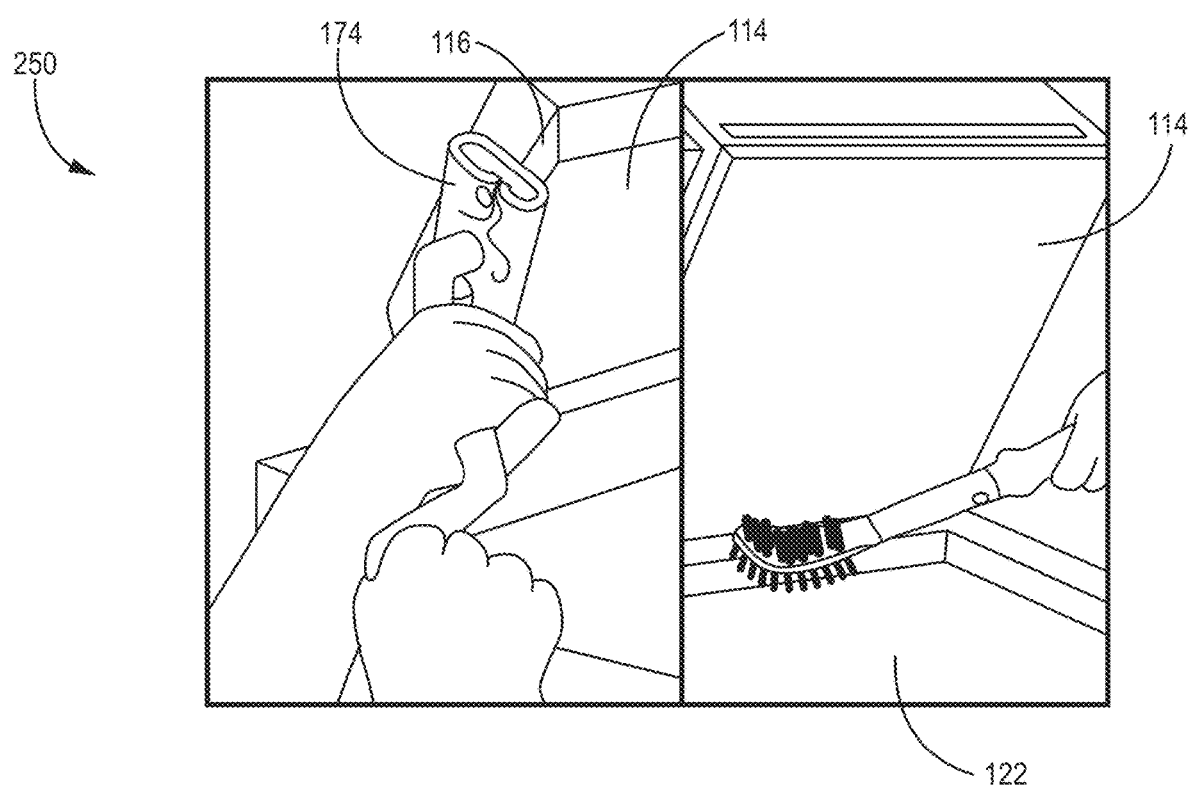

FIG. 12 is an illustration of step 250 of the method. Step 250 may include scrubbing any area with visible soil accumulation until soil liquefies. In some embodiments, or in situations where it is needed, the upper platen 112 may be scrubbed with a second scrub brush. Thoroughly cleaning the grill 100, including the sides 116 of the platens 112 is important in order to prevent damage to the grill 100 over time.

Figure 13:
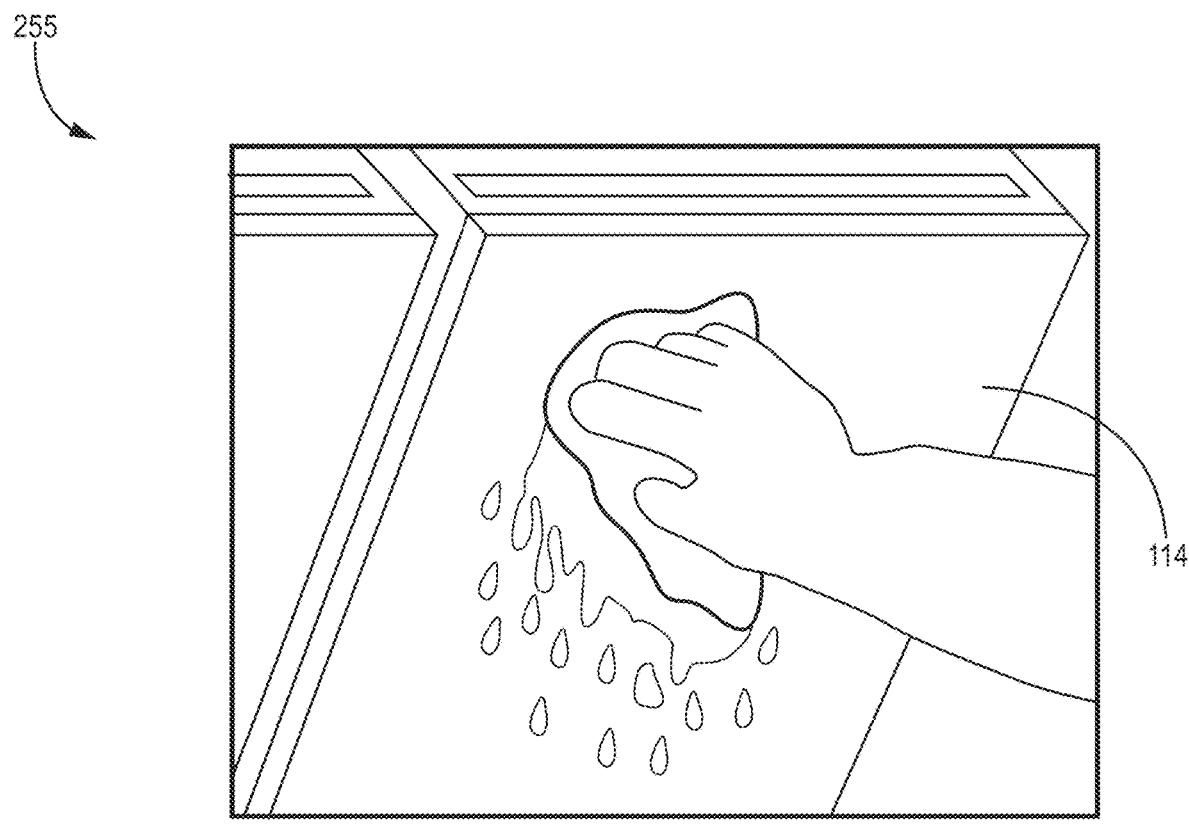

FIG. 13 is an illustration of step 255 of the method. Step 255 may include rinsing the upper platens with a clean sanitizer-soaked grill cloth 172 and discarding the soiled grill cloth 172. In addition to rinsing the upper platens, step 255 may also include cleaning surrounding areas such as a hood, bull nose and backsplash (not shown).

Figure 14:
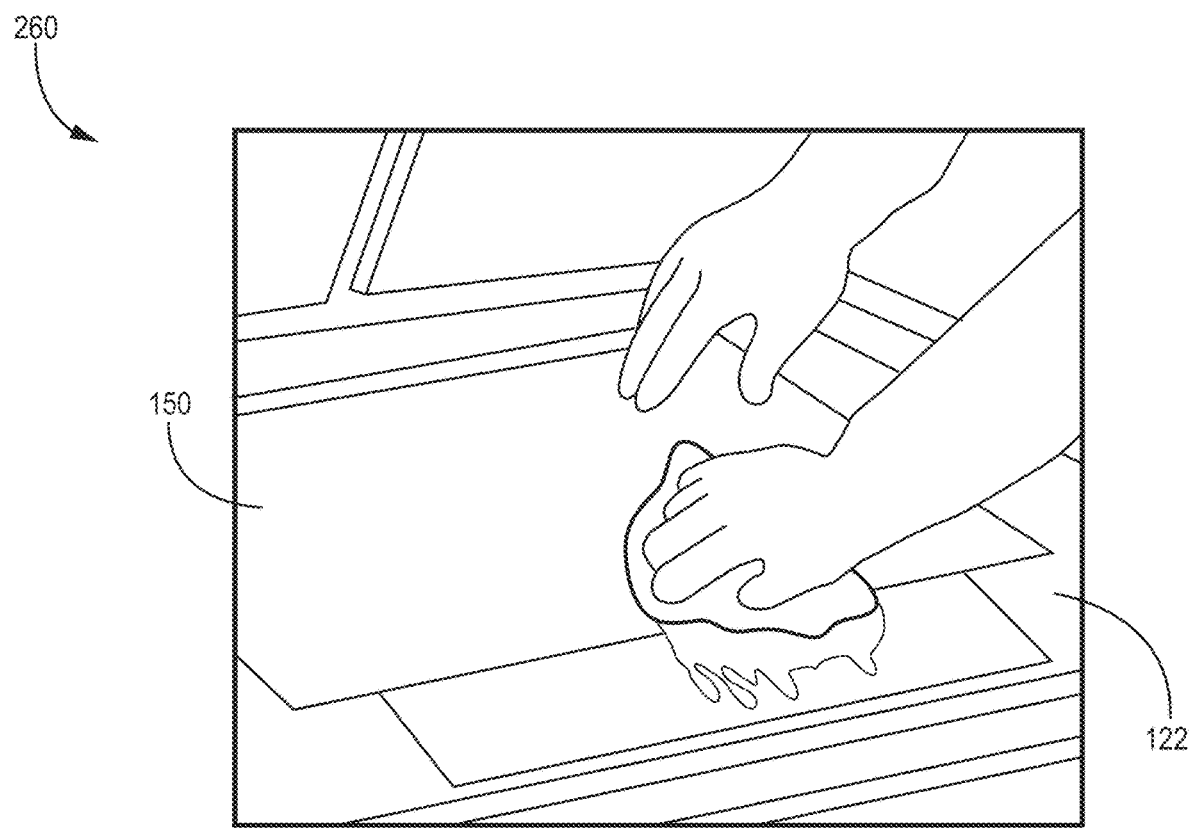

FIG. 14 is an illustration of step 260 of the method. If using release sheets 142, step 260 may include preparing to install or re-install the upper release sheets 150. Step 260 may include placing the upper release sheets 150 onto the lower grill surface 122 for support while wiping. Step 260 may also include preparing the upper release sheets 150 to be installed or re-installed on the upper platens 112 by wiping both sides of each upper release sheet 150 with a clean sanitizer-soaked grill cloth 172 and discarding the grill cloth 172.

Figure 15:
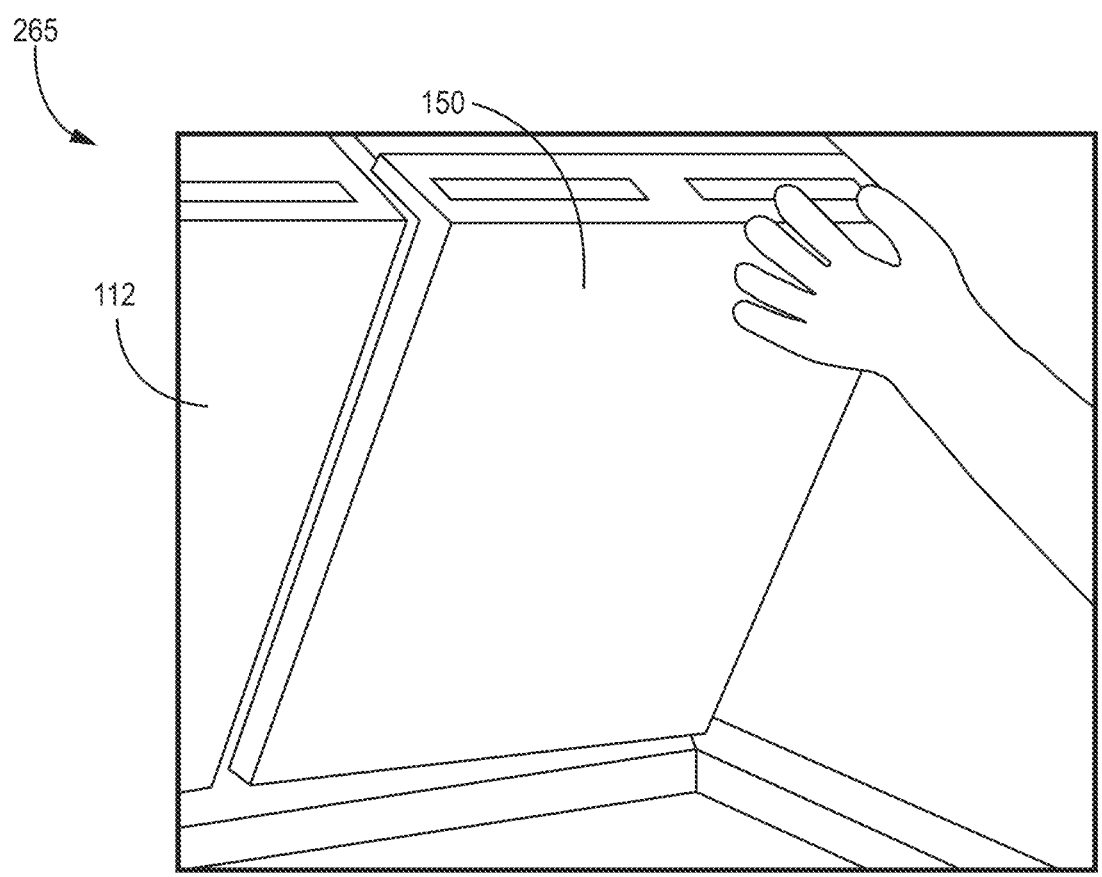

FIG. 15 is an illustration of step 265 of the method. Step 265 may include installing the upper release sheets 150 on the upper platens 112. To prolong sheet life, the upper release sheets 150 should be installed on the opposite side of the release sheet 150 than what was previously used for cooking.

Figure 16:
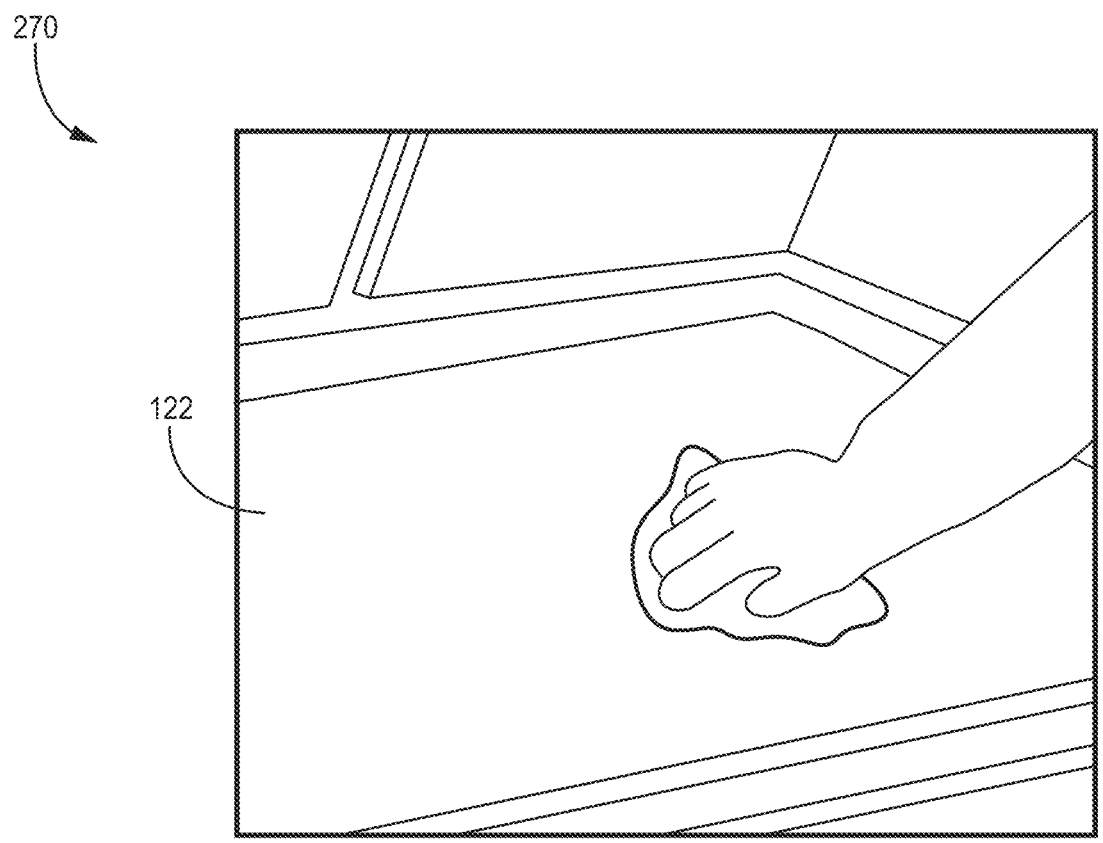

FIG. 16 is an illustration of step 270 of the method. Step 270 may include wiping the lower grill surface 122 with a clean sanitizer-soaked grill cloth 172 and discarding the cloth.

Figure 17:
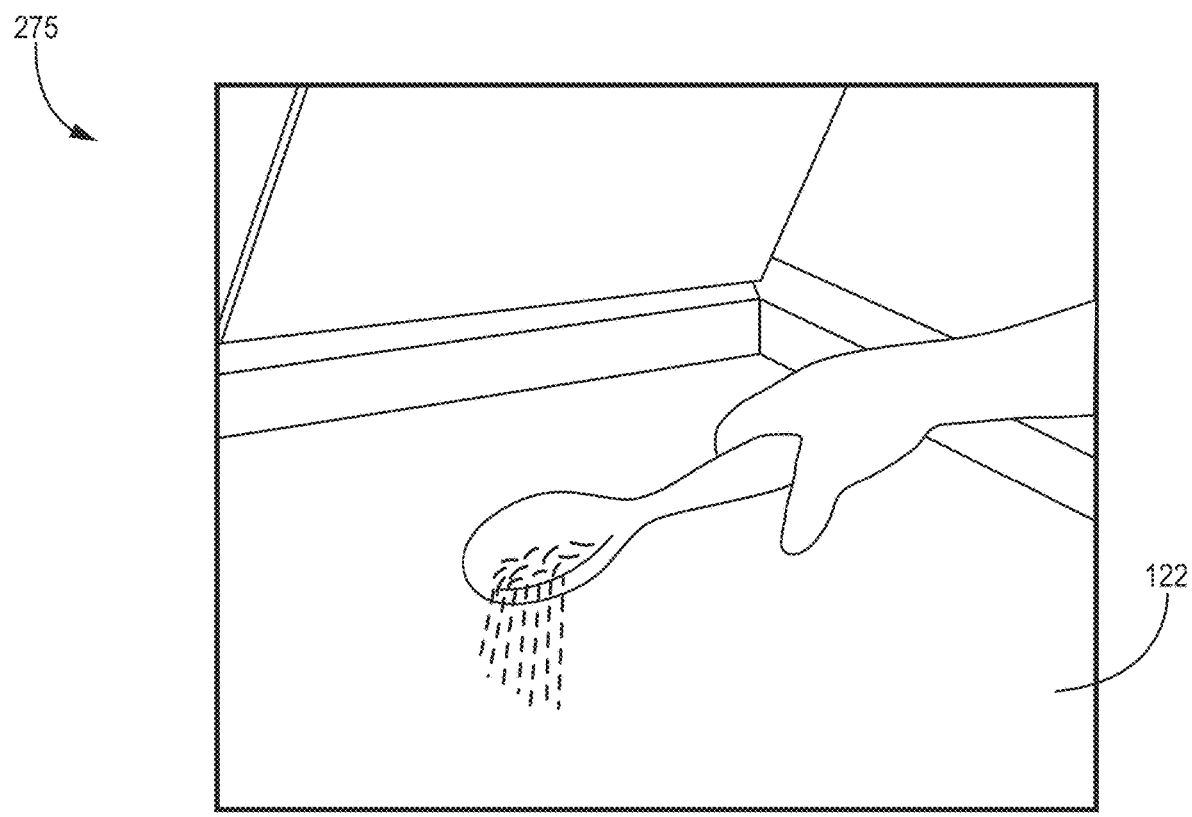

FIG. 17 is an illustration of step 275 of the method. Step 275 may be employed in embodiments where lower release sheets 140 are being used. Step 275 may include turning the grill 100 on and sprinkling Soy Adhesion Flakes on the lower grill surface 122. Step 275 may further include spreading the Soy Adhesion Flakes on the cooking zone with a clean squeegee before installing the lower release sheets 150 on the lower grill surface 122.

Figure 18:
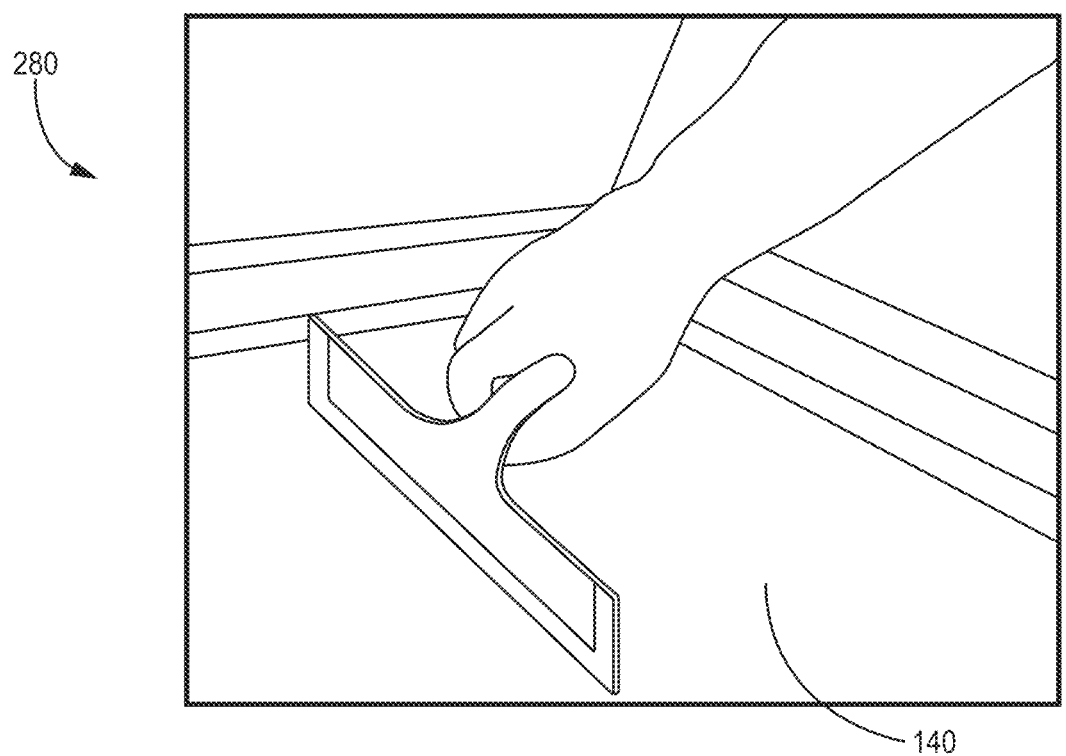

FIG. 18 is an illustration of step 280 of the method. Step 280 may be employed in embodiments where lower release sheets 140 are being used. Step 280 may include squeegeeing air bubbles and wrinkles out of each release sheet. If the restaurant is closing, the grill 100 may be turned off, otherwise, the grill 100 may be returned to the appropriate setting for cooking.

Figure 19:
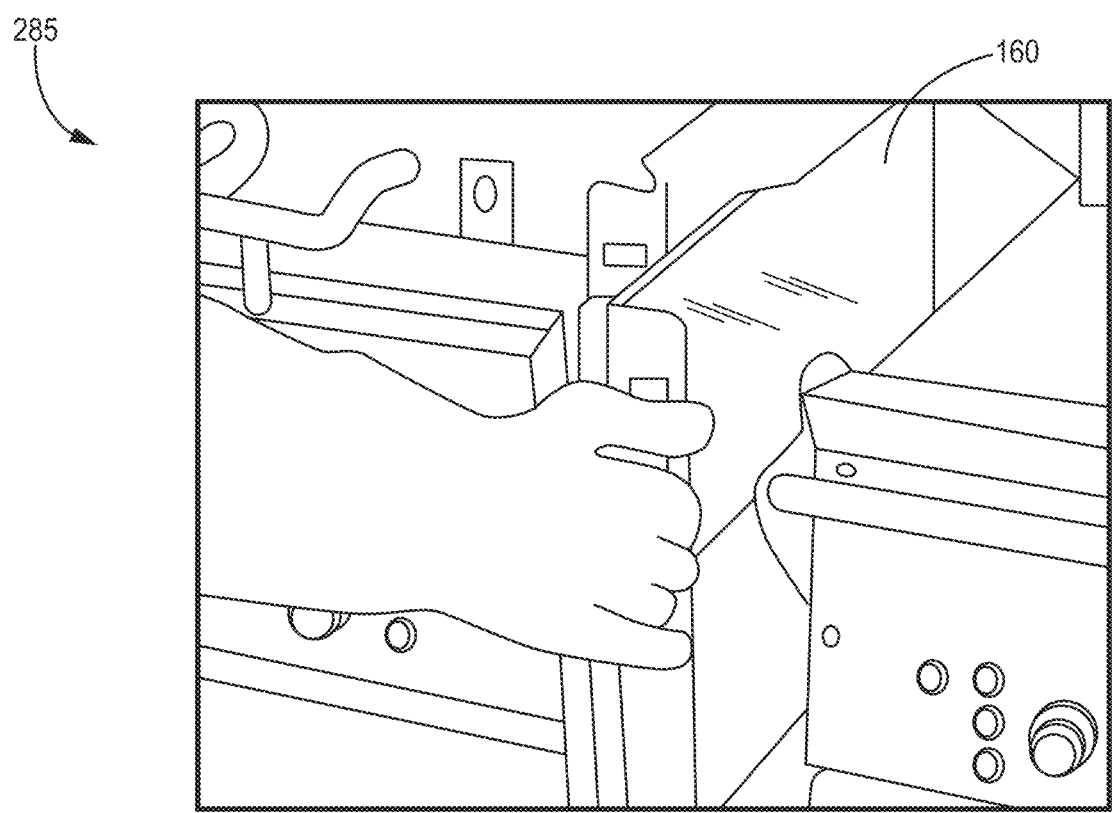

FIG. 19 is an illustration of step 285 of the method. Step 285 may include removing and emptying the grease trough 160 and rinsing and replacing the grease trough 160.

Figure 20:
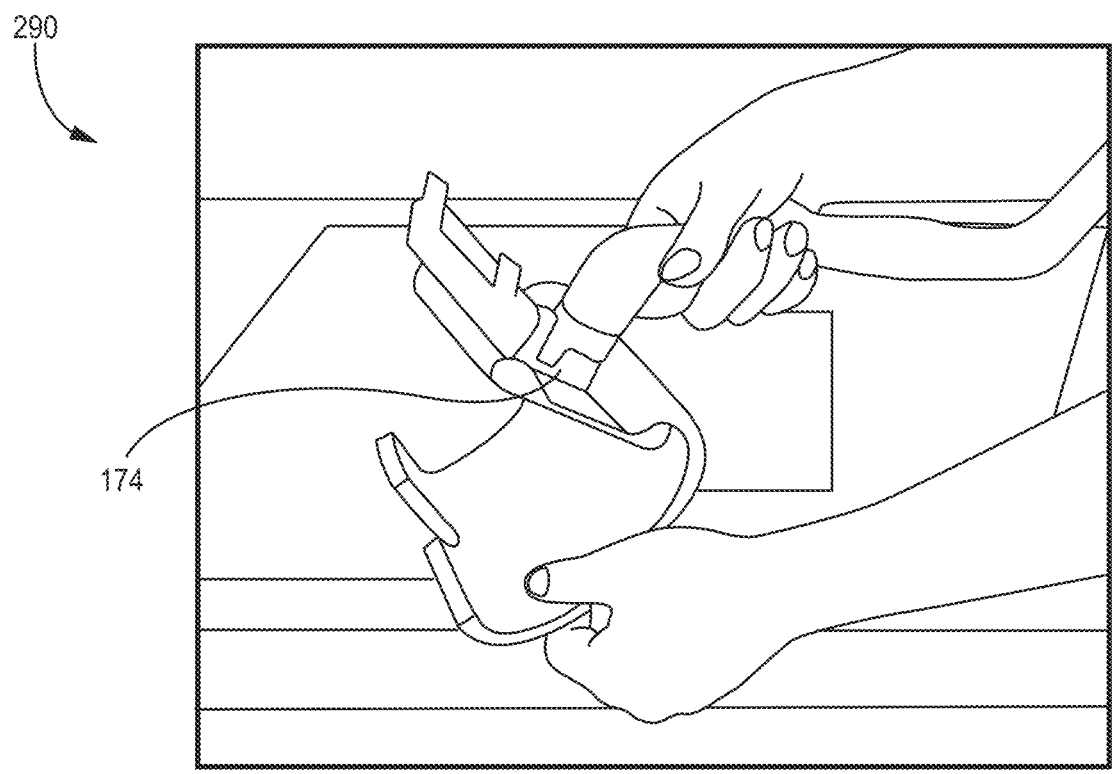

FIG. 20 is an illustration of step 290 of the method. Step 290 may include general clean-up tasks such as removing, washing and rinsing the grill 100 pad 174 and then flipping over and replacing the pad 174 on the tool for the next grill 100 cleaning. All other utensils and tools used to clean the grill 100 may be washed, rinsed and sanitized.

Figure 21:
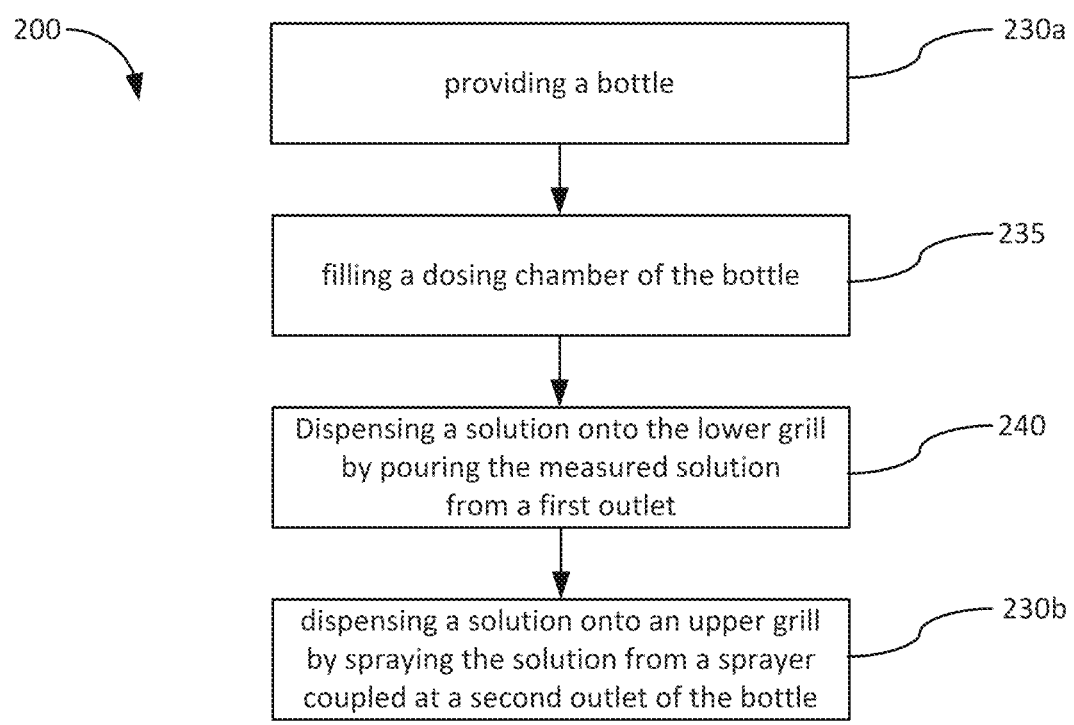
FIG. 21 is a flow chart showing selected steps of the exemplary method described in FIGS. 3-20.

FIG. 21 shows a flow chart including some steps of the method 200 described above. The embodiment of FIG. 21 may include providing a bottle (step 230*a*). If the bottle does not already include a solution, fill the bottle with a desired solution. Step 235 may include filling a dosing chamber of the bottle from a reservoir chamber of the bottle. Step 240 may include dispensing the solution onto the lower grill by pouring the measured solution from a first outlet of the bottle. Step 230*b* may include dispensing the solution onto an upper grill surface by spraying the solution from a sprayer at a second outlet of the bottle. The order of the steps is changeable. Additional steps may be included or removed, as desired.

Although the steps of the method 200 may be employed with the measured dosing and spray bottle 1 described herein, steps of the exemplary method 200 may be employed with other bottles, and other methods may be employed with the exemplary bottle 1. In addition, not all steps of the exemplary method 200 may be required. Some steps may be eliminated, and other steps may be added.

In some embodiments, a bottle such as shown in FIG. 1 can be pre-filled with solution and sealed, for example, via one or more induction seals, ahead of distribution to a use site. In some such examples, the solution in the bottle 1 and the volume of the dosing chamber 20 can be specifically arranged for performing a cleaning task at the use site. For instance, a particular cleaning task may be known to require a predetermined volume of a solution having a predetermined composition and dilution. A bottle (e.g., 1) can be constructed having a dosing chamber (e.g., 20) having a volume equal to the predetermined volume. The bottle can be filled with the solution having predetermined composition and dilution and sealed for delivery to the use site for efficient performance of the particular cleaning task.

Illustrative embodiments of bottles and methods of cleaning have been set forth, and reference has been made to some possible variations. These and other variations and modifications of the invention will be apparent to those skilled in the art without departing from the scope of the invention, and it should be understood that this invention is not limited to the illustrative embodiments set forth herein.

Various examples have been described. These and other examples are within the scope of the following claims.

The invention claimed is:

1. A method comprising the steps of:
   rotating a bottle so that a predetermined amount of solution flows from a reservoir chamber into a dosing chamber in the bottle;
   outputting, via a first outlet of the bottle, the predetermined amount of solution from the dosing chamber to a first cleaning surface, wherein the bottle comprises a partition separating the reservoir chamber and the dosing chamber such that, when outputting the predetermined amount of solution from the dosing chamber to the first cleaning surface, solution from the reservoir chamber does not flow to the dosing chamber or the first outlet, wherein the partition includes a partition sidewall interfacing with the dosing chamber, the partition sidewall extending a length between one partition sidewall end at a lower end of the dosing chamber and an opposite partition sidewall end close to an upper end of the bottle, the length of the partition sidewall extending along an axis at an angle in a direction from the lower end of the dosing chamber toward the upper end of the bottle; and
   outputting, via a second outlet of the bottle, solution from the reservoir chamber to a second cleaning surface,
   wherein the axis, along which the partition sidewall extends, intersects the second outlet, wherein the opposite partition sidewall end terminates at a first plane that intersects the first outlet, and wherein the opposite partition sidewall end is aligned with the second outlet via a second axis extending through the second outlet and the opposite partition sidewall end, the second axis extending perpendicular to a second plane along which the upper end of the bottle extends, the first plane extending parallel to the second plane.

2. The method of claim 1, wherein the partition separates the reservoir chamber and the dosing chamber such that, when outputting the predetermined amount of solution from the dosing chamber to the first cleaning surface, solution from the reservoir chamber does not flow to the dosing chamber, the first outlet, or the second outlet.

3. The method of claim 1, wherein an opening is created at the dosing chamber after the predetermined amount of solution flows from the reservoir chamber into the dosing chamber.

4. The method of claim 3, wherein the opening is created by opening a cap covering the first outlet.

5. The method of claim 4, wherein the cap comprises a flip cap having a first portion coupled to the first outlet of the bottle and a second portion coupled to the bottle via a hinge, and wherein opening the cap comprises rotating the cap, via the hinge, away from the first outlet.

6. The method of claim 1, wherein outputting, via the second outlet of the bottle, solution from the reservoir chamber to the second cleaning surface comprises actuating a spray head at the bottle to cause solution to flow from the reservoir chamber to the spray head and to spray from the spray head onto the second cleaning surface.

7. The method of claim 6, wherein actuating the spray head comprises actuating a trigger at the spray head.

8. The method of claim 7, wherein the second outlet is positioned proximate an upper end of the bottle.

9. The method of claim 8, wherein the trigger does not extend below the upper end of the bottle.

10. The method of claim 6, further comprising the step of:
spraying the solution from the spray head onto a cloth or sponge and cleaning the second cleaning surface with the cloth or sponge.

11. The method of claim 1, wherein the first cleaning surface comprises a horizontal cleaning surface.

12. The method of claim 11, wherein the second cleaning surface comprises a vertical cleaning surface.

13. The method of claim 12, wherein the horizontal cleaning surface is a lower grill surface of a grill.

14. The method of claim 13, wherein the vertical cleaning surface is an upper grill surface of the grill.

15. The method of claim 1, wherein the partition is positioned so that the dosing chamber holds a predetermined maximum volume when the bottle is in an upright position.

16. The method of claim 15, wherein the predetermined maximum volume is two ounces.

17. The method of claim 1, wherein the dosing chamber includes one or more measurement markings for indicating a level of solution in the dosing chamber.

18. The method of claim 1, wherein the predetermined amount of solution flows from the reservoir chamber into the dosing chamber upon tilting the bottle to an angle greater than 90 degrees from vertical.

19. A bottle comprising:
a reservoir chamber at the bottle and defining a second outlet;
a dosing chamber at the bottle and defining a first outlet; and
a partition separating the reservoir chamber and the dosing chamber such that, when outputting a predetermined amount of solution from the dosing chamber to a first cleaning surface, solution from the reservoir chamber does not flow to the dosing chamber, wherein the partition includes a partition sidewall interfacing with the dosing chamber, the partition sidewall extending a length between one partition sidewall end at a lower end of the dosing chamber and an opposite partition sidewall end close to an upper end of the bottle, the length of the partition sidewall extending along an axis at an angle in a direction from the lower end of the dosing chamber toward the upper end of the bottle, wherein the axis, along which the partition sidewall extends, intersects the second outlet, wherein the opposite partition sidewall end terminates at a first plane that intersects the first outlet, and wherein the opposite partition sidewall end is aligned with the second outlet via a second axis extending through the second outlet and the opposite partition sidewall end, the second axis extending perpendicular to a second plane along which the upper end of the bottle extends, the first plane extending parallel to the second plane.

20. The bottle of claim 19, further comprising:
a sprayer for dispending solution via the second outlet, the sprayer including a spray head and a trigger that, when actuated, draws solution from the reservoir chamber and dispenses the solution by spraying.

* * * * *